Patented June 9, 1953

2,641,619

UNITED STATES PATENT OFFICE 2,641,619

PRODUCTION OF DIOLEFINS FROM OLEFINS

Charles R. Noddings, George W. Waldron and John W. Corey, Midland, Mich., assignors to The Dow Chemical Company, Midland, Mich., a corporation of Delaware No Drawing. Application December 26, 1950, Serial No. 202,808

4 Claims. (Cl. 260—680)

This invention concerns an improved method for the catalytic dehydrogenation of olefines, having at least four carbon atoms in the unsaturated carbon chain of the molecule, to form corresponding aliphatic conjugated diolefines. It pertains more particularly to improvements in a process wherein such dehydrogenation of an olefine is carried out at high temperatures in the presence of steam using a catalyst comprising a calcium nickel phosphate as its active principal ingredient.

In U. S. Patent No. 2,442,319 it is disclosed that certain normal calcium nickel ortho-phosphates, and mixtures of the same with minor amounts, e. g. 30 per cent by weight or less, of chromium oxide, are highly effective in catalyzing the dehydrogenation of olefines, having at least four carbon atoms in the unsaturated chain of the molecule, in the presence of steam at reaction temperatures not exceeding 750° C., but that such catalyst has little, if any, effect in catalyzing the dehydrogenation of paraffinic hydrocarbons, or of other olefines, under such reaction conditions. Because of its effectiveness and its selective action in catalyzing the dehydrogenation of olefines having four or more carbon atoms in the unsaturated chain of the molecule, such catalyst is suitable for the production of an aliphatic conjugated diolefine, e. g. butadiene or isoprene, etc., in high yield and readily purifiable form from either pure or impure olefinic starting materials. For instance, it may be applied in producing 1,3-butadiene in good yield and purifiable form from 1-butylene, 2-butylene, or a mixture thereof, which contains a substantial amount of other hydrocarbons such as ethane, propane, butane, pentane, ethylene, propylene, or isobutylene, etc. The catalyst promotes dehydrogenation of the 1-butylene and 2-butylene to form 1,3-butadiene, but does not catalyze to an appreciable extent decomposition of the other hydrocarbons. Periodically, the catalyst is freed of cumulated carbonaceous deposits by treatment at 400° C. or above with a mixture of steam and air or oxygen.

The catalytically active calcium nickel phosphate contains from 6 to 12, preferably from 7.5 to 9.2, atoms of calcium per atom of nickel, the calcium and nickel being chemically combined with ortho-phosphate radicals. It may be formed and precipitated by admixing, in an aqueous medium, a water-soluble ortho-phosphate, e. g. phosphoric acid or an ammonium phosphate, with nitrates or other water-soluble salts of calcium and nickel in the proportions theoretically required to form such product, while maintaining the mixture in a neutral to alkaline condition. The precipitate is washed with water, until substantially free of water-soluble salts, and dried. It is usually pelletized, as such or in admixture with 30 per cent by weight or less of chromic oxide, so as to bring it to a form convenient for use as a catalyst.

U. S. Patents 2,442,320, 2,456,367 and 2,456,368 and a pending application of S. B. Heath, Serial No. 686,134, filed July 25, 1946, now U. S. Patent No. 2,542,813, issued February 20, 1951, disclose modifications in the above-described methods of preparing and employing such calcium nickel phosphate-containing catalysts.

During attempts to employ the above-discussed normal calcium nickel phosphate-containing catalysts for the production of aliphatic conjugated diolefines on a commercial scale using a reaction vessel of a kind conventionally employed for such dehydrogenations with other catalysts, unexpected difficulties were encountered. By-product formation increased during use of the catalyst, with a resultant decrease in the yield and ease of purification of the conjugated diolefine product. These difficulties were so serious that use of the catalyst was discontinued and further production of the diolefine was carried out with a conventional dehydrogenation catalyst of considerably lower activity and selectivity for the production of a diolefine than was initially possessed by the calcium nickel phosphate-containing catalyst.

It was subsequently found that the difficulties just mentioned were not due to an action of the calcium nickel phosphate, per se, but instead were caused by a catalytic coaction between the calcium nickel phosphate and the walls of the reaction vessel containing the same, which catalytic coaction was widely different from the catalytic action of the calcium nickel phosphate alone and was such as to modify and impair the catalytic action of the calcium nickel phosphate contained in the vessel. In other words, materials previously recommended, and employed satisfactorily, for construction of reactors for the production of diolefines from olefines with other kinds of dehydrogenation catalysts are unsatisfactory when using the calcium nickel phosphate-containing catalyst.

Ordinary iron and steel cannot satisfactorily be used for construction of the catalyst chamber, since they weaken, and are badly corroded at the reaction temperatures by the steam and air employed in the process. Nickel-bearing alloy steels are adequately strong and resistant to the action of steam and air at the reaction temperature and have heretofore been used satisfactorily in the construction of reactors for the dehydrogenation of olefines to form diolefines in the presence of other dehydrogenation catalysts. However, a reaction vessel constructed of a nickel-alloy steel is unsatisfactory when employing the calcium nickel phosphate-containing catalyst, since use of such catalyst in contact with a nickel alloy steel results in extensive by-product formation and in formation of hard carbonaceous deposits within the catalyst body during use for the dehydrogenation of an olefine.

To be satisfactory for the construction, or internal lining, of a reaction vessel in which the calcium nickel phosphate is to be employed for the catalytic dehydrogenation of an olefine in the presence of steam to form a corresponding conjugated diolefine, it is necessay that a material of construction be rigid and resistant to the action of steam and air at temperatures of from 600° to 750° C.; that it have no appreciable action in catalyzing the decomposition of aliphatic hydrocarbons at such temperatures, and that it be inert to, and have no appreciable effect of modifying the catalytic action of, the calcium nickel phosphate at such reaction temperatures.

It is an object of the invention to provide materials which may satisfactorily be used for the construction, or lining, of reactors within which the calcium nickel phosphate-containing-catalyst is to be employed for the dehydrogenation of olefines in the presence of steam to form corresponding aliphatic conjugated diolefines. Another object is to provide an improved process for the production of aliphatic conjugated diolefines which comprises passage of a mixture of a corresponding olefine and steam through a bed of such catalyst supported by, or confined in a chamber having walls of, one or more of the materials hereinafter specified. Further objects will be evident from the following description of the invention.

We have found that a chrome alloy steel, consisting essentially of iron and from 4 to 30 per cent by weight of chromium, and also ceramic materials having softening points higher than 750° C. are resistant to attack by air and are substantially inert to steam and aliphatic hydrocarbons at temperatures in the order of from 550° to 750° C.; are sufficiently strong and rigid for support and confinement of the calcium nickel phosphate-containing catalyst at such temperatures; and have no appreciable effect at such temperatures of catalyzing decomposition or carbonization of the hydrocarbons in the reaction mixture, or of modifying appreciably the catalytic action of the calcium nickel phosphate catalyst in contact therewith. Accordingly, the full catalytic effect, selectivity, and active life of the calcium nickel phosphate-containing catalyst in catalyzing the dehydrogenation of olefines in the presence of steam to form corresponding conjugated diolefines may be obtained, provided the catalyst is supported on, and retained or confined by, one or more of the above-named structural materials during employment in the reaction.

It is important that the structural material be substantially free of nickel, since nickel, if present in the inner walls of the reactor, coacts catalytically with the calcium nickel phosphate catalyst to cause considerable by-product formation, e. g. carbonization and cracking of carbon chains of the hydrocarbons fed to the dehydrogenation, and the resultant formation of by-products such as carbon, tarry material, methane, ethane, propane, ethylene, propylene, or acetylenic hydrocarbons, etc., becomes more extensive as the dehydrogenation reaction is continued. Any of the usual chrome alloy steels which are substantially free of nickel, e. g. alloy steel containing from 96 to 69.5 per cent of iron and from 4 to 30 per cent of chromium, together usually with 0.5 per cent by weight or less of carbon, may be employed for support of the catalyst during employment in the dehydrogenation process. The ceramic materials are, of course, usually free from nickel. Examples of ceramic materials suitable for use in contact with the calcium nickel phosphate catalyst are quartz or silica which has been fused and formed into tubes, tile, rods, or other shapes having extended surfaces, alumina, aluminum silicate, and brick, tile, or tubes of baked clay. All such ceramic materials have softening points above 750° C. and have properties rendering them suitable for retention, or confining, of a bed of the calcium nickel phosphate catalyst during employment of the latter for the dehydrogenation of an olefine to form a corresponding aliphatic conjugated diolefine.

The reaction chamber in which the catalyst is employed may be of any usual design, e. g. it may consist merely of a tower or chamber for holding a bed of the catalyst and provided with an inlet and outlet for passage of the reaction vapors through the bed. A number of reaction chambers of suitable design are known. The reaction chamber may be constructed of, or lined internally with, a chrome alloy steel which is free of nickel, or it may be constructed of ordinary structural steel, e. g. a carbon steel, and be lined on the inside with brick, tile, tubing, or a cement, of ceramic material. The requirement that the reactor be constructed of, or lined internally with, one or more of the structural materials just mentioned, pertains only to the portions of the reactor which are in direct contact with the calcium nickel phosphate catalyst during employment of the latter in the process, e. g. other internal surfaces of the reactor may be constructed of any suitable structural materials including, if desired, a nickel alloy steel or a nickel-chromium alloy steel. However, during practice of the process, there is chance that particles of the catalyst may be blown into contact with internal surfaces of the reactor other than those supporting the catalyst bed, hence all internal walls of the reactor are usually, and advantageously constructed of a chromium alloy steel or a ceramic material.

Except for the requirement that the calcium nickel phosphate catalyst bed be supported or retained by surfaces of a chrome-alloy steel or a ceramic material, the process for production of an aliphatic conjugated diolefine is similar to that described in U. S. Patent No. 2,442,319. The reaction chamber is charged with the granular calcium nickel phosphate-containing catalyst which may include a minor amount of a lubricant, such as graphite, vegetable oil, or a hydrocarbon oil, etc., used as a binder in forming pellets of the catalyst. Such lubricant, if present, is removed by passing air, or preferably a mixture of about equal volumes of air and steam, through the catalyst bed at temperatures between 450° and 750° C. When such lubricant is a material capable of being vaporized, e. g. a mineral or vegetable oil, the step of treating the catalyst with air may be preceded by one of passing an inert gas such as steam, nitrogen, or carbon dioxide over the catalyst so as to vaporize and remove at least a portion of the binder from the catalyst granules.

In instances, in which the catalyst is obtained in a form free of lubricant, or other organic impurities, the preliminary treating steps just described may be omitted.

When substantially free of carbon-containing impurities, the catalyst bed is swept free of air with steam and is heated to the desired reaction temperature preferably by passing superheated steam through the reaction chamber containing the catalyst. A mixture of steam and the olefine reactant, e. g. butylene, amylene, or a hexylene, or a mixture of steam and such olefine together with other paraffinic hydrocarbons or with olefinic hydrocarbons having the same or a lesser number of carbon atoms in the molecule as that possessed by the olefinic reactant, is passed through the reaction chamber and the catalyst bed therein, at reaction temperatures not exceeding 750° C., e. g. between 550° and 750° C. and preferably between 600° and 700° C. The usual procedure is to pass the olefine-containing gas into admixture with steam which has been superheated to 750 C. or above, i. e. to a temperature sufficient so that the resultant mixture is at the desired reaction temperature, and to pass the mixture through the reaction vessel containing the calcium nickel phosphate catalyst. If desired, the heat may be supplied in other ways, such as by forming the steam and hydrocarbon mixture at a lower temperature and passing the mixture through a preheater to bring it to the desired temperature. The yield of diolefine is usually highest when from 15 to 20 volumes of steam are employed per volume of the reactive olefine in the hydrocarbon starting material, but the steam may be used in larger proportions if desired. The rate of vapor flow through the catalyst chamber may be varied widely, but usually corresponds to between 50 and 700 liters of the olefine (expressed as at 0° C. and 760 millimeters absolute pressure) per liter of catalyst bed per hour.

The vapors flowing from the catalyst chamber are ordinarily passed through heat exchangers and other cooling devices to condense and remove the water from the hydrocarbon products. The conjugated diolefine product may be separated from the other hydrocarbons in usual ways, e. g. by reaction with sulphur dioxide or cuprous ammonium salts to form a double compound, and the unreacted olefine be recycled in the process.

By operating as just described using a reaction vessel of, or internally lined with, a chrome alloy steel or a ceramic material for support and retention of the calcium nickel phosphate catalyst, the olefine, or olefines, in the feed mixture which have four or more carbon atoms in an unsaturated carbon chain of the molecule are selectively dehydrogenated to form a corresponding conjugated diolefine, or diolefines, in excellent yield and readily purifiable form. Carbonization and other side reactions occur to only a minor extent. However, the catalyst bed does gradually accumulate a small amount of carbon, or nonvolatile organic material, and decreases in catalytic activity. Accordingly, flow of the hydrocarbon starting material is periodically interrupted and a mixture of air and steam is passed at temperatures between 450° and 700° C., and preferably at the dehydrogenation temperature, through the reaction chamber and the bed of catalyst therein so to oxidize and remove the carbonaceous, or organic, material and thus reactivate the catalyst. From 10 to 30 minutes is usually required for carrying out such reactivation step. The reaction chamber is then again swept free of air with steam, after which the introduction of an olefine together with the steam is resumed. Usually, reactivation is advisable after from 30 to 60 minutes of employment of the catalyst in the dehydrogenation reaction. In practice, two or more catalyst chambers are employed in a system provided with connections for passing the reaction mixture alternately through different beds of the catalyst. One catalyst chamber is reactivated while another is being employed in the dehydrogenation reaction. By operating in this way, the dehydrogenation is carried out in a continuous manner.

The following examples describe ways in which the invention has been practiced and illustrate certain of its advantages, but are not to be construed as limiting the invention.

EXAMPLE 1

In each of two experiments, a reaction tube of 1 inch internal diameter was filled to a depth of 11 inches with pellets of a catalytic mixture of 94.7 per cent by weight of a normal calcium nickel ortho-phosphate, containing approximately 8 atoms of calcium per atom of nickel, and 5.3 per cent of chromic oxide. The pellets were each $\frac{3}{16}$ inch thick and of $\frac{3}{16}$ inch diameter. The catalyst used in both experiments was from the same source and was identical. A tube of a nickel chromium alloy steel, known as KA2S and containing approximately 18 per cent by weight of chromium, 8 per cent of nickel, less than 0.5 per cent of carbon, and the remainder iron, was used as the reaction tube in one of the experiments. The reaction tube employed in the other experiment was of a chromium alloy steel known as Alleghany 55, which steel contains approximately 25 per cent by weight of chromium, less than 0.5 per cent of carbon, and the remainder iron. In each experiment, a mixture of from 15 to 20 parts by volume of steam and one part of gaseous hydrocarbons, containing from 70 to 85 per cent by weight of normal butylenes, i. e. 1-butylene and 2-butylene, from 23 to 8 per cent of butanes, about 4 per cent of isobutylene, about 3 per cent of 1,3-butadiene, and about 1 per cent of $C_5$ hydrocarbons was passed at temperatures of from 600° to 630° C. through one of the above-mentioned reaction tubes for 30 minutes. The feed of hydrocarbons was then interrupted and carbonaceous accumulations were oxidized and removed from the catalyst bed by passing a mixture of air and the steam through the reaction tube at temperatures of about 600°–630° C. for approximately 30 minutes. The flow of air was then discontinued, air quickly being blown from the tube by the steam, and the feed of hydrocarbons together with the steam was resumed. This cycle of operations, which required about one hour, was repeated 2,500 times in each experiment. It may be mentioned that the hydrocarbon mixtures fed to the reaction were drawn from cylinders and that the relative proportions of normal butylenes and butanes in the hydrocarbon feed material varied somewhat when one cylinder became exhausted and was replaced by another. It is for this reason that the composition of the hydrocarbon feed material is given above as being within stated limits. The hydrocarbons in each cylinder had been analyzed so that the composition of the hydrocarbons fed to the reaction in each cycle of operations was known. It may also be mentioned that the changes in composition of the hydrocarbon feed material during the reaction caused small changes in the conversion, i. e. in the proportion of the hydrocarbons consumed in a given cycle of operations, but did not cause appreciable change in the per cent yield of 1,3-butadiene based on the amount of normal butenes consumed. For convenience, such yield of 1,3-butadiene, based on the normal butylenes consumed, is hereinafter referred to as the per cent "selectivity" of the reaction. Since the principal purpose of the experiments was to determine the effect of reaction chamber walls on the selectivity of the catalytic dehydrogenation reaction and since the changes in composition of the hydrocarbon feed material upon replacing one cylinder of such material with another did not have appreciable effect on the selectivity, it is sufficient to state that the hydrocarbon starting materials were of compositions within the limits hereinbefore stated and is unnecessary to give the exact composition of the hydrocarbon starting material at various stages in the process. The experiment using the KA2S reaction tube was started using a reaction vapor feed mixture containing 15 parts by volume of steam per part of the hydrocarbons therein. It was formed by passing steam through a preheater wherein it was superheated to a temperature such that, upon mixing the same with a stream of the hydrocarbon vapors, the resultant mixture was at a temperature of 600° C. The rate of flow of the hydrocarbon stream into admixture with the steam was 200 volumes of the gaseous hydrocarbons (expressed as at 0° C. and 760 millimeters absolute pressure) per volume of the catalyst bed per hour. The temperature and rate of flow of the steam was maintained substantially constant throughout the first 1700 cycles of operation. In the catalyst reactivation step of each of the first 2,130 cycles of operation, the rate of air feed into admixture with the steam and then through the reaction tube was 85 volumes of air (expressed as at 0° C. and 760 millimeters absolute pressure) per volume of the catalyst bed per hour. In the dehydrogenation stage of each cycle of operations, the vapors flowing from the reaction tube were cooled sufficiently to condense the steam. The remaining gaseous products were collected and analyzed to determine the amounts of unconsumed normal butylenes and of 1,3-butadiene therein. On a basis of these values and the known composition of the hydrocarbon starting mixture, there were calculated, for each 500 cycle period of the process, the per cent of the butylenes in the starting mixture which were consumed in the reaction (which value is hereinafter referred to as the per cent conversion) and the per cent yield of 1,3-butadiene based on the normal butylenes consumed, i. e. the selectivity of the reaction. During operation with the KA2S reaction tube under the conditions stated above, the selectivity remained high for about 500 cycles of operation, but decreased markedly during the next 1000 cycles. At the end of 1700 cycles the rate of hydrocarbon feed to the reaction was increased from 200 to 275 volumes of the same per volume of catalyst bed per hour and the reaction temperature was increased from 600° to 630° C. in attempt to obtain improved conversion and selectivity values. However, the selectivity continued to decrease. When 2,130 cycles of operations had been carried out, the rate of air flow in the catalyst reactivation step was increased from 85 to 150 volumes of air (expressed as at 0° C. and 760 millimeters absolute pressure) so as to assure substantially complete oxidation of the carbonaceous accumulations in the catalyst bed during each of the subsequent cycles of operation.

The experiment using the Alleghany 55 tube was carried out using a hydrocarbon starting mixture of composition within the limits stated above and using one hour cycles of operations similar to those employed in the above experiment. However, in the experiment using the Alleghany 55 reaction tube, there was no appreciable decrease in the reaction selectivity during the 2,500 cycles of operation, and the activity of the catalyst did not decrease appreciably until after 2,000 operating cycles. Accordingly, the rates of flow of the several gaseous starting materials were maintained constant throughout the experiment. The rate of hydrocarbon feed was 275 volumes of gaseous hydrocarbons (expressed as at 0° C. and 760 millimeters absolute pressure) per volume of the catalyst bed per hour. The rate of steam feed was such that the mixture entering the reaction zone contained 15 parts by volume of steam per part of the gaseous hydrocarbons. In the catalyst reactivation step of each operating cycle, the rate of air feed was 85 volumes of air per volume of the catalyst bed per hour. During the first 2,300 cycles of operation, the dehydrogenation reaction was carried out at a temperature of 600° C. The reaction temperature was then raised to 630° C. and maintained at that value during the remainder of the experiment. The hydrocarbon products from each cycle of operations were collected and analyzed as described above. From the analysis and the known composition of the hydrocarbon starting material, the per cent conversion and per cent selectivity values for each successive 500 cycle period of the process were calculated.

The following table identifies each experiment by stating the kind of reaction tube employed. It gives the average per cent conversion and average per cent selectivity values for each of the successive 500 cycle periods of operation in each experiment.

*Table I*

| Cycles of Operation | Exp't Using KA2S Tube | | Exp't Using Alleghany 55 Tube | |
|---|---|---|---|---|
| | Percent Conversion | Percent Selectivity | Percent Conversion | Percent Selectivity |
| 1–500 | 27.5 | 91 | 25 | 93 |
| 501–1,000 | 31 | 87.5 | 27.5 | 93 |
| 1,001–1,500 | 30 | 82 | 27.5 | 93 |
| 1,501–2,000 | 27.5 | 79.5 | 30.5 | 92 |
| 2,001–2,500 | 31 | 75 | 25 | 94 |

EXAMPLE 2

Two experiments were carried out in a manner similar to that described in Example 1, except that the reaction tubes, each of 1 inch internal diameter, were constructed of KA2S steel and of silica, respectively. The catalyst employed in each experiment was material from a larger bed of catalyst that had been used for 66 days in a vessel of a nickel chromium alloy steel (i. e. a steel containing 18 per cent of chromium and 8 per cent of nickel) for the dehydrogenation of normal butylenes to form 1,3-butadiene and had been found unsatisfactory during use in such vessel. Except for having been used, the catalyst was similar to that employed in Example 1. The amount of catalyst employed in each experiment of this example was the same as in Example 1. Also, the hydrocarbon feed mixtures employed in both experiments were the same and were of a composition within the limits given in Example 1. Throughout the dehydrogenation steps of each experiment, the rate of feed of hydrocarbons to the reaction mixture was 275 volumes of the gaseous hydrocarbons (expressed as at 0° C. and 760 millimeters absolute pressure) per volume of the catalyst bed per hour and steam was fed at a rate such that the reaction mixture, when formed, contained 15 parts by volume of steam per part of the gaseous hydrocarbons. In the catalyst reactivation steps of each experiment, the rate of air feed was 85 volumes of air (expressed as at 0° C. and 760 millimeters absolute pressure) per volume of the catalyst bed per hour. A dehydrogenation reaction temperature of 620° C. was used in the first 252 cycles of operation in the experiment employing the KA2S tube, and a reaction temperature of 640° C. was employed during the remainder of the experiment. In the experiment carried out with the fused silica tube, the dehydrogenation reaction temperature was 620° C. for the first 480 cycles of operation and thereafter was 650° C. The reaction selectivity decreased rapidly in the experiment using the KA2S tube and the experiment was terminated after 300 cycles of operation. The reaction selectivity increased during the experiment with the fused silica tube and the experiment was carried out over a period of 500 cycles. The hydrocarbon products from the dehydrogenation step in each operating cycle of each experiment were analyzed to determine the amounts of unconsumed normal butylenes and of 1,3-butadiene therein. From the analyses and the known composition of the hydrocarbon feed mixture, the average conversion value and the average selectivity value were calculated for each of three successive 100 cycle periods of operation in each experiment and for the final 200 cycles of operation with the reaction tube of fused silica. These values for each experiment are given in Table II. The table identifies each experiment by stating the kind of reaction tube employed.

*Table II*

| Cycles of Operation | Exp't With KA2S Tube | | Exp't With Fused Silica Tube | |
|---|---|---|---|---|
| | Percent Conversion | Percent Selectivity | Percent Conversion | Percent Selectivity |
| 1–100 | 19 | 92.0 | 20.0 | 84.5 |
| 101–200 | 29 | 77.5 | 27.5 | 84.5 |
| 201–300 | 31 | 70.0 | 27.0 | 80.0 |
| 301–500 | | | 31.5 | 82.5 |

Other modes of applying the principle of the invention may be employed instead of those explained, change being made as regards the method herein disclosed, provided the step or steps stated by any of the following claims or the equivalent of such stated step or steps be employed.

We claim:

1. In a method wherein an olefine having at least 4 carbon atoms in the unsaturated carbon chain of the molecule is dehydrogenated to form a corresponding aliphatic conjugated diolefine by passing the olefine, together with steam, at reaction temperatures not exceeding 750° C. through a bed of a dehydrogenation catalyst comprising, as its catalytically active principal ingredient, a normal calcium nickel ortho-phosphate material having, chemically combined with the phosphate radicals, from 6 to 12 atoms of calcium per atom of nickel, the step of supporting the bed of catalyst on, and confining it by, surfaces of at least one substantially inert solid material, of the group consisting of nickel-free chromium alloy steels and ceramic materials which are solid and rigid at the reaction temperature, while carrying out the reaction by passing the heated reaction vapors through the catalyst bed and into contact with the material confining the bed.

2. A method, as described in claim 1, wherein the solid material confining, and in contact with, the bed of catalyst is a chromium alloy steel which is free of nickel.

3. A method, as described in claim 1, wherein the solid material confining, and in contact with, the bed of catalyst is a ceramic material which is solid and rigid at the reaction temperature.

4. A method, as described in claim 1, wherein the solid material confining, and in contact with, the bed of catalyst is silica.

CHARLES R. NODDINGS.
GEORGE W. WALDRON.
JOHN W. COREY.

References Cited in the file of this patent

UNITED STATES PATENTS

| Number | Name | Date |
|---|---|---|
| 2,265,641 | Grosskinsky et al. | Dec. 9, 1941 |
| 2,347,527 | Vanderbilt | Apr. 25, 1944 |
| 2,442,319 | Britton et al. | May 25, 1948 |